United States Patent Office 3,510,336

Patented May 5, 1970

3,510,336
REFLEX COPYING METHOD

Murray Figov and Roger Hotter, London, England, assignors to GAF (Great Britain) Limited, London, England No Drawing. Filed Aug. 2, 1966, Ser. No. 569,605
Claims priority, application Great Britain, Aug. 12, 1965, 34,620/65
Int. Cl. B41m 5/12
U.S. Cl. 117—1.7 10 Claims

ABSTRACT OF THE DISCLOSURE

Reflex copying process involving exposure of an original bearing an infra-red absorptive image in contact with sheet material having thereon a thermographic coating of a fusible azo coupling component to form a latent image of fused coupling component, dusting of the image with a powdered solid benzene diazonium salt or diazo oxide followed by development and fixing by exposure to radiant heat. The thermographic coating may include a resin to increase the adhesion of the developed image.

This invention relates to a method for preparing a diazotype copy of an original, e.g. a printed document or drawing, by means of reflexwise exposure to infra-red radiation. Copies produced by this method generally have a very high degree of contrast (and sharpness, are stable to light and heat) and are suitable as final copies or as intermediate sheets for the production of copies by conventional two component or one component diazotype processes.

According to the present invention we provide a method of reflex copying by exposing to radiant heat a sheet material in contact with an original, the sheet material including a thermographic layer comprising an azo coupling component, to form a latent image of melted coupler, and coating the resultant latent image with a powdered solid benzene diazonium salt or a diazo oxide, and developing and fixing the image by exposure to radiant heat.

Preferred azo coupling components used in the present method have melting points at temperatures between 50° C. and 150° C. Expedient coupling components are the aceto-acetic arylamides or resorcinol derivatives, for example:

aceto-acet-o-toluidides;
aceto-acet-o-chloranilide;
aceto-acet-m-4-xylidide;
aceto-acet-p-anisidide;
aceto-acet-p-toluidide;
aceto-acet-m-hydroxanilide;
aceto-acet-p-hydroxanilide
4,6-dichloro resorcinol
di-(hydroxy ethyl) resorcinol The above-mentioned exemplified compounds have low water-solubility and may be applied to the sheet material in the form of a solution by dissolving the azo coupling component in a volatile organic solvent, e.g. ethyl alcohol, coating the solution onto the sheet material and allowing the solvent to volatilse.

Azo coupling components have sharp melting points and thus a high degree of contrast between background and image is obtainable.

It is advisable to carry out powder development within a few seconds after exposing the thermographic layer to radiant heat since the tacky latent image quickly resolidifies. To increase the tendency of the latent image formed by the method of this invention to adhere to the said powder a resin may be incorporated into the thermographic layer. The resin may, for instance, be a melamine/formaldehyde resin such as "Beetle" melamine resin BE 27, "Lytron" 820 and "Beetle" urea resin BE 610. Particularly effective are carboxyl-containing styrene-maleic ester copolymers e.g. "Lytron" 825, "Lytron" 820, "Lytron" RM007 and "Lytron" 822.

The first exposure to radiant heat in the method of this invention may be made with a sensitized face of a heat sensitive azo coupler sheet in contact with the original, using a translucent support so that the copy may be read through the base. Alternatively, and also in accordance with this invention the first exposure may be made with an uncoated face of a thermographic sheet in contact with the original in which case a right reading copy of the original is obtained. Suitable supports in this latter case are for instance air-mail paper, vegetable parchment paper, or glassine paper coated on one side with a suspension of titanium dioxide and with its heat sensitive layer coated either on top of this layer or on the other side of the paper, or on a plastic (e.g. polyester) film.

The developer powder used in this invention may contain a diazonium salt such as 4-benzoylamino 2,5 diethoxybenzene-1-diazonium chloride zinc chloride double salt, 4-diethylamino benzene-1-diazonium chloride zinc chloride double salt 4-diphenylamino benzene diazonium sulphate or 4-dimethylamino benzene diazonium chloride double salt; or a diazo oxide such as that derived from 2-amino 5-nitrophenol or that derived from 2-amino 4-chloro 5-nitrophenol. It may be applied by cascading the diazo by itself or in an admixture with for instance fine glass balls, over the latent image, or by applying the diazo with a brush. An expedient procedure is to grind up the diazo with iron filings, to attract the mixture onto the end of a magnet and to use the said system as a magnetic brush over the latent image to apply the diazo.

During the developing and fixing stage, the heat sensitive layer is remelted and where the powder has adhered to it is taken into solution. The azo coupler has a high coupling activity and combines with the diazo to form an azo-dye of high visual and actinic density.

If the heat sensitive layer is placed in contact with the original so that a read-through translucent copy is obtained, the developing and fixing stage may be effected using a strong exposure to infra-red radiation with the image formed in contact with an uncoated piece of paper. An image is transferred to the plain paper to give a right reading copy, and sufficient dye remains on the translucent support as to constitute a second copy. Alternatively, the translucent copy may be used as a hectographic master.

The present invention is illustrated by the following examples (parts therein being by weight):

EXAMPLE I

A solution of 4 parts aceto acet-m-4-xylidide and 4 parts aceto acet-o-toluidide in 100 parts ethyl alcohol is coated on a translucent paper of weight 35 g./m.$^2$ which is then dried with hot air. The copying material is placed sensitized face downwards on top of an original and passed under an infra-red source of radiation. The copying material is separated from the master and its sensitized face brushed with a magnetic brush (as described above) containing 2,5 diethoxy 4-benzoylamino benzene-1-diazonium chloride zinc chloride double salt. The copy material is developed and fixed by re-passing under the infra-red source of radiation. A brown image is produced.

EXAMPLE II

A solution of 8 parts aceto acet-o-chloranilide, 3 parts phloroglucinol and 1 part "Lytron" 825 in 100 parts of ethyl alcohol is coated on an 85 g./m.$^2$ "Gateway" tracing paper and dried with hot air. It is then exposed, as in Example I and a bristle brush used to dust the tacky latent image with the diazo oxide made from 2-amino α-naphthol-5-sulphonic acid. A black image is obtained which may be developed and fixed as described in Example I.

EXAMPLE III

A solution of 1 part "Lytron" 820 and 8 parts aceto acet-m-4-xylidide in 100 parts ethyl alcohol is coated on 35 g./m.$^2$ translucent paper and dried with hot air. It is exposed, developed and fixed as in Example I using as the developer powder the diazo oxide derived from the 2-amino 4-chloro 5 nitro phenol, and applying with a magnetic brush (as described above). A brown-black print is obtained.

EXAMPLE IV 45 g./m.$^2$ air-mail paper is precoated with a solution of 10 parts of gelatin in 100 parts of water. A solution of 5 parts aceto acet-p-hydroxanilide and 1 part "Lytron" 822 is coated on the precoat and the infra-red exposure made with the sensitized side of the heat-sensitive sheet away from the original. The diazo oxide used in development is 2 amino 5 nitro phenol. The print obtained after developing and fixing by exposure to the infra-red source is a dark brown right reading copy.

EXAMPLE V

One side of 35 g./m.$^2$ glassine paper is coated with a suspension of 20 parts titanium dioxide in a solution of 5 parts "Lytron" 820, 55 parts ethyl alcohol, 30 parts methyl ethyl ketone, 10 parts methyl cellulose acetate and 5 parts isopropyl alcohol. The other side of the paper is coated with 1 part "Beetle" resin BE27 and 5 parts aceto acet-p-toluidide in 100 parts ethyl alcohol. The exposure is made with the heat sensitive layer remote from the original and developed and fixed as in Example IV with a similar result.

EXAMPLE VI

A solution of 6 parts of 4.6 dichloro-resorcinol, 1 part "Lytron" 820 and 1 part "Bettle" resin 610 in 80 parts methyl ethyl ketone and 20 parts n-butyl alcohol is coated on polyester film (trade name "Melinex") and dried. It is then exposed as in Example I and 4-dimethylamino benzene diazonium chloride, zinc chloride double salt is cascaded as a fine powder onto the exposed film. A black image is obtained on development and fixing is effected as described in Example I. This type of copy is very suitable for projection on to a screen or as an intermediate for multiple copying by one or two component diazotype paper.

EXAMPLE VII

A precoat of 2 parts "EMU" POWDER FD (Ex Badische Anilin & Soda Fabrik A.G.) in 100 parts methyl ethyl ketone is applied on 60 g./sq. metre vegetable parchment paper and dried. The thermographic layer is then applied on the precoat consisting of 2 parts "Lytron" 820, 8 parts of di-(hydroxy ethyl) resorcinol in 100 parts methyl ethyl ketone and dried. The uncoated face of the paper is placed in contact with the original and exposed reflexwise to infra-red radiation. After exposure the latent image which is right reading is dusted with 4-diphenylamino benzene diazonium sulphate powder, then developed and fixed as in Example I. A black image is obtained against a white ground. This type of copy can be used as a final copy or as an intermediate as in Example VI.

EXAMPLE VIII

A solution of 1 part "Lytron" 820, 1 part "Bettle" resin 610 and 8 parts aceto-acet-m-4-kylidide in 160 parts methyl ethyl ketone and 40 parts n-butyl alcohol is coated on 55 g./sq. metre vegetable parchment and dried. It is then exposed as in Example VII and dusted with 3 chloro- 4-pyrrolidino benzene diazonium borofluoride salt as a powder, then fixed. A brown-black image is obtained.

What we claim and desire to secure by Letters Patent is:

1. A method of reflex copying by exposing to radiant heat a sheet material in contact with an original, the sheet material including a thermographic layer comprising a fusible azo coupling component to form a latent image of melted coupling component, dusting the layer including said melted coupling component with a powder selected from the group consisting of powdered solid benzene diazonium salts and powdered solid diazo oxides, whereby the powder adheres to and is retained only by said melted coupling component and developing and fixing the image by exposure to radiant heat whereby an azo dye is formed in said image.

2. Method according to claim 1, wherein the azo coupling component has a melting point between 50° C. and 150° C.

3. Method according to claim 1, wherein the azo coupling component is an aceto-acetic arylamide.

4. Method according to claim 1, wherein the azo coupling component is selected from the group consisting of aceto-acet-o-toluidide, aceto-acet-o-chloranilide, aceto-acet-m-4-xylidide, aceto-acet-p-anisidide, aceto-acet-p-toluidide, aceto-acet-m-hydroxanilide or aceto-acet-p-hydroxanilide.

5. Method according to claim 1, wherein the azo coupling component is a resorcinol derivative.

6. Method according to claim 1, wherein the azo coupling component is 4,6-dichloro resorcinol or di-(hydroxy alkyl) resorcinol.

7. Method according to claim 1, wherein a resin is incorporated into the thermographic layer so as to increase the tendency of the resultant developed image to adhere to the said powder.

8. Method according to claim 7 wherein said resin is selected from the group consisting of melamine/formaldehyde resins and carboxyl-containing styrene-maleic ester copolymer resins.

9. Method according to claim 1 wherein said sheet material is paper or plastic film.

10. A method of reflex copying by exposing to radiant heat in contact with an original, a sheet of paper or plastic film, including a thermographic layer comprising a resin and an azo coupling component having a melting point between 50° C. and 150° C. to form a latent image of melted azo coupling component, and dusting the layer including said melted coupling component with a powder selected from the group consisting of powdered solid benzene diazonium salts and powdered solid diazo oxides whereby the powder adheres to and is retained only by said melted coupling component, and developing and fixing the image by exposure to radiant heat whereby an azo dye is formed in said image, said resin increasing the tendency of the developed image to adhere to said powder.

References Cited

UNITED STATES PATENTS

| | | | |
|---|---|---|---|
| 2,597,306 | 5/1952 | Eaton | 96—49 X |
| 2,727,820 | 12/1955 | Botkin et al. | 96—49 X |
| 2,939,009 | 5/1960 | Tien | 96—49 X |
| 3,083,117 | 3/1963 | Schmiedel et al. | 117—17.5 |
| 3,196,029 | 7/1965 | Lind | 117—1.7 |
| 3,260,612 | 7/1966 | Dulmage et al. | 117—1.7 X |
| 3,909,200 | 3/1967 | Berman | 96—49 |
| 3,360,371 | 12/1967 | Munder et al. | 117—36.8 X |
| 3,362,380 | 1/1968 | Anderson et al. | 250—65 X |
| 3,364,858 | 1/1968 | Kojima et al. | 117—1.7 X |

MURRAY KATZ, Primary Examiner

E. J. CABIC, Assistant Examiner

U.S. Cl. X.R.

96—49; 117—21, 36.8; 250—65